(12) United States Patent
Sommer et al.

(10) Patent No.: US 10,315,697 B2
(45) Date of Patent: Jun. 11, 2019

(54) VEHICLE COMPRISING A MANOEUVRING SYSTEM

(71) Applicant: Deutsche Post AG AG, Boon (DE)

(72) Inventors: Martin Sommer, Aachen (DE); Tobias Augspurger, Aachen (DE); Oskar Kraft, Stollberg (DE); Marco Bellof, Aachen (DE); Tobias Athmer, Bonn (DE); Markus Hamm, Aachen (DE); Fabian Schmitt, Eynatten (DE)

(73) Assignee: Deutsche Post AG, Bonn (DE)

( * ) Notice: Subject to any disclaimer, the term of this patent is extended or adjusted under 35 U.S.C. 154(b) by 0 days.

(21) Appl. No.: 15/631,013

(22) Filed: Jun. 23, 2017

(65) Prior Publication Data

US 2017/0369101 A1    Dec. 28, 2017

(30) Foreign Application Priority Data

Jun. 24, 2016 (DE) .......................... 10 2016 111 618

(51) Int. Cl.
*G05D 1/02* (2006.01)
*B62D 13/06* (2006.01)
*B62D 15/02* (2006.01)

(52) U.S. Cl.
CPC ......... *B62D 13/06* (2013.01); *B62D 15/0285* (2013.01); *G05D 1/0246* (2013.01); *B62D 15/027* (2013.01)

(58) Field of Classification Search
CPC .. B62D 13/06; B62D 15/0285; B62D 15/027; B62D 13/005; G05D 1/0246;
(Continued)

(56) References Cited

U.S. PATENT DOCUMENTS

| 7,429,051 B2 * | 9/2008 | Bauer | B60D 1/36 280/6.15 |
| 8,989,972 B2 * | 3/2015 | Anderson | A61B 5/6804 701/301 |

(Continued)

FOREIGN PATENT DOCUMENTS

DE    19526702 A1    2/1997
DE    102008057610 A1    4/2008

OTHER PUBLICATIONS

Machine translation of DE102006057610A1 by Lexis Nexis Total Patent on Aug. 15, 2017.
(Continued)

*Primary Examiner* — Nicholas Kiswanto
(74) *Attorney, Agent, or Firm* — Woodard, Emhardt, Henry, Reeves & Wagner, LLP

(57) ABSTRACT

In a vehicle comprising a maneuvering system for maneuvering a predetermined part of the vehicle into a target position provided by a target object, wherein the maneuvering system comprises a first optical sensor device, arranged at the vehicle, for capturing the target object and a calculating device for calculating a trajectory of the predetermined part of the vehicle into the target position with the aid of an image of the target object captured by the first optical sensor device, fast and safe maneuvering should be facilitated by improved monitoring of the maneuvering process and an improved calculation of the trajectory of the predetermined part of the vehicle into the target position, as a result of which accidents and damage to humans, vehicles and wares are avoided. This is achieved by virtue of the maneuvering system comprising a second optical sensor device arranged at the vehicle in a manner offset relative to the first optical sensor device in the longitudinal direction of the vehicle.

19 Claims, 5 Drawing Sheets

(58) Field of Classification Search
CPC .... G05D 1/0212; G05D 1/0225; G05D 1/024; B60R 1/003; G01S 5/16; G01S 17/06; G01S 17/026; G01S 17/88; G01S 17/93; G01S 17/936
See application file for complete search history.

(56) References Cited

U.S. PATENT DOCUMENTS

| | | | |
|---|---|---|---|
| 9,393,917 B2* | 7/2016 | Hughes | B60R 11/04 |
| 9,880,263 B2* | 1/2018 | Droz | G01S 7/4802 |
| 9,886,035 B1* | 2/2018 | Watts | G05D 1/0251 |
| 9,975,487 B2* | 5/2018 | Lewis | B60R 1/00 |
| 9,983,590 B2* | 5/2018 | Templeton | G05D 1/0246 |
| 2015/0325126 A1* | 11/2015 | Schwindt | G08G 1/16 |
| | | | 701/36 |
| 2016/0238698 A1* | 8/2016 | Vuorenkoski-Dalgleish | |
| | | | G01S 17/88 |

OTHER PUBLICATIONS

Machine translation of DE19526702A1 by Lexis Nexis Total Patent on Aug. 15, 2017.

* cited by examiner

VEHICLE COMPRISING A MANOEUVRING SYSTEM

BACKGROUND

The invention relates to a vehicle comprising a manoeuvring system for manoeuvring a predetermined part of the vehicle into a target position provided by a target object, wherein the manoeuvring system comprises a first optical sensor device, arranged at the vehicle, for capturing the target object and a calculating device for calculating a trajectory of the predetermined part of the vehicle into the target position with the aid of an image of the target object captured by the first optical sensor device.

Quick and secure handling of wares is very important in the transportation and logistics sector. Wares for the transportation are frequently stored in freight containers, such as e.g. containers, roll cages or swap bodies, with commercial vehicles or unit load automatic guided vehicles driving under said freight containers and receiving said freight containers for onward transport. In the process, the vehicles for receiving the wares must be manoeuvred below the freight container to be received. Quick and safe manoeuvring is decisive to this end. These days, the manoeuvring is often carried out with the aid of sensor devices, which are fastened to the vehicle and able to capture a target object and calculate a trajectory of the vehicle into the target position given by the target object by means of a calculating device.

The prior art has disclosed various methods and apparatuses for sensor-assisted manoeuvring and driving under an object. Thus, DE 195 26 702 A1 describes a system for backward manoeuvring and for handling swap containers, in which a camera aligned onto the zone of the backward driving direction is fastened to the road vehicle or trailer, the steering of which is automatically regulated by a regulating device during the backward manoeuvring into a predetermined target position for handling containers.

DE 10 2006 035 929 A1 describes a method for sensor-assisted driving under an object, in particular a swap body, by means of a commercial vehicle, wherein surrounding information is captured by at least one sensor arranged at the rear end of the commercial vehicle and the relative position between the object and the commercial vehicle is determined on the basis of the captured surrounding information.

DE 10 2006 057 610 A1 also describes a method and an apparatus for image-assisted docking on a target object with a vehicle. Here, distance information from the surroundings of the vehicle is captured by means of an image sensor fastened to the rear end of the vehicle. The distance information is used to determine the distance between the vehicle and the target object and carry out a closed-loop vehicle-height control for docking on the target object.

The placement of the sensor devices on the vehicle is often problematic in these methods and apparatuses. Especially the sensitive process while driving under the target object may not be monitored in its entirety or not carried out at all under certain circumstances if, for example, the sun, which shines onto an optical sensor device, is low. For working relative positioning, it must be possible to perceive at least the target object as well. If this is not the case, for example on account of glare, the process generally cannot be carried out. Accidents and damage to vehicles, freight containers and wares may be the consequence.

SUMMARY

Proceeding herefrom, the invention is therefore based on the object of providing an option for facilitating quick, safe and robust manoeuvring by way of improved monitoring of the manoeuvring process and an improved calculation of the trajectory of the predetermined part of the vehicle into the target position. This should avoid accidents and damage to freight containers, vehicles and wares, and a high availability quotient should be obtained in practice, independently of environmental influences.

According to the invention, the object is achieved by the subject matter of the independent claims. Advantageous configurations of the invention are specified in the dependent claims.

Hence, according to the invention, provision is made of a vehicle comprising a manoeuvring system for manoeuvring a predetermined part of the vehicle into a target position provided by a target object, wherein the manoeuvring system comprises a first optical sensor device, arranged at the vehicle, for capturing the target object and a calculating device for calculating a trajectory of the predetermined part of the vehicle into the target position with the aid of an image of the target object captured by the first optical sensor device, wherein the manoeuvring system comprises a second optical sensor device arranged at the vehicle in a manner offset relative to the first optical sensor device in the longitudinal direction of the vehicle. The offset arrangement of the second optical sensor device facilitates improved monitoring of the manoeuvring process and an improved calculation of the trajectory of the predetermined part of the vehicle into the target position.

In the present case, optical sensor devices are understood to mean systems which capture electromagnetic waves in the range from ultraviolet to infrared and convert these into electrical signals. The light which is reflected or emitted by an object is detected. As a matter of principle, a distinction is made between active and passive sensors, with active sensors emitting light themselves and passive sensors only being provided for the detection of light.

In an advantageous configuration of the invention, the optical sensor devices are cameras and/or LIDAR sensors and/or time-of-flight cameras and/or stereo cameras. In this respect, the term "image" in the present case means all that which may be captured using such optical sensors. In principle, any combination of these types of sensor devices is possible. The aforementioned optical sensor devices allow the image-like representation of distances of a whole scene in 2D or 3D. The term LIDAR denotes "light detection and ranging" and denotes a method for an optical distance and speed measurement. This method is preferably used in driverless transportation vehicles for recognizing obstacles and avoiding accidents with people who could cross the automatic travel paths.

TOF (time-of-flight, also ToF) cameras are 3D camera systems which measure distances using a time-of-flight method. To this end, a scene to be measured is illuminated by means of a light pulse and the camera measures, for each pixel, the time which the light requires to get to the object and back again. The required time is directly proportional to the distance. The aforementioned sensor devices are particularly advantageous as they are able to capture the distance of the object imaged thereon for each pixel. As a result, objects may be recognized by means of an image analysis of the recorded images and the ideal trajectory of the predetermined part of the vehicle into the target position may be calculated by means of the calculating device.

In principle, the optical sensor devices may be arranged at the same height. However, the sensor devices are advantageously fastened to the vehicle in a manner offset along the vertical axis of the vehicle. The z-axis of the coordinate system is referred to as the vertical axis. It is possible to monitor different regions in an improved manner by way of an offset arrangement of the sensor devices along the vertical axis of the vehicle, and so the manoeuvring process may be monitored in an improved fashion and the trajectory may be calculated more precisely. In addition or as an alternative thereto, provision is made according to a preferred development of the invention for the two optical sensor devices to have different pitch angles, i.e. to be rotated to a different extent along the transverse axis of the vehicle.

In principle, the optical sensor devices may be installed in a secure or rigid manner. However, provision is preferably made for the height of at least one of the optical sensor devices to be adjustable, preferably for the heights of both optical sensor devices to be adjustable. The height adjustment is advantageous for adapting the optical sensor devices to various situations and thus facilitating the best view of the target object to be captured for each optical sensor device. Moreover, a height adjustment may be expedient in the case of a change in the predetermined part of the vehicle. By way of example, the predetermined part of the vehicle may be changed as a result thereof and the vehicle may be manoeuvred into a target position provided by a target object with the other side. This may be expedient, in particular, in the case of autonomous transportation vehicles, which are configured to drive under and receive freight containers with both ends of their longitudinal direction. Laborious manoeuvring of the vehicle into a different position may therefore be avoided by a simple height adjustment of the optical sensor devices.

In accordance with a further configuration of the invention, provision may be made for the first optical sensor device to be fastened to the predetermined part of the vehicle and for the second optical sensor device to be fastened to such a location on the vehicle from which the second optical sensor device is able to capture the image of the target object, relevant for manoeuvring, from a position which is elevated in relation to the position of the first optical sensor device. Such an arrangement of the optical sensor devices ensures that both optical sensor devices are able to capture the target object in an ideal fashion. Transport vehicles for transporting wares often have a flat loading area which extends parallel to the roadway and is designed for receiving freight containers.

As a result of the elevated position of the second optical sensor device, it is possible to ensure not only an ideal capture of the target object but also monitoring of the loading area. Obstacles situated on the loading area, which could be a hindrance when receiving the freight containers, can hence be recognized in good time and accidents can be prevented. Furthermore, it is ensured that the target object can be captured by means of the second optical sensor device if capturing of the target object is not possible by means of the first optical sensor device. As an alternative or in addition thereto, provision can be made for the viewing angle of the first optical sensor device to differ from the viewing angle of the second optical sensor device. Different viewing angles may be advantageous for capturing the target object.

As an alternative or in addition thereto, provision may moreover be made for at least one optical sensor device to be rotatable and/or swivellable, preferably for both optical sensor devices to be rotatable and/or swivellable, and hence for the viewing angle of at least one of the optical sensor devices to be adjustable, preferably for the viewing angles of both optical sensor devices to be adjustable. As a result of rotatably and/or swivellably arranged optical sensor devices, it is always possible to obtain a viewing angle onto the target object to be captured that is as good as possible. Moreover, rotating and/or swivelling may be advantageous as this allows the number of sensors to be reduced. By way of example, if the intention for a vehicle is that of using the other end of its longitudinal direction for receiving the freight containers, the optical sensor devices may be realigned onto the target object by simple swivelling and/or rotating.

In a preferred configuration of the invention, the optical sensor devices are configured in such a way that they permit the calculation of a trajectory of the predetermined part of the vehicle into the target position independently of one another, but of course together with the calculating device. An independent calculation of the trajectory may be advantageous, in particular, if one of the optical sensor devices can no longer be used for the calculation of the trajectory. By way of example, this may be the case if the optical sensor devices fail or if an optical sensor device is covered by the object where the intention is to drive underneath the latter or in the case of bad visibility. Further, the optical sensor device not used for calculating the trajectory may be used for further objects, e.g. as a collision warning system.

In particular, provision may be made for at least one of the optical sensor devices to be displaceable along the longitudinal direction of the vehicle, preferably for both optical sensor devices to be displaceable along the longitudinal direction of the vehicle. As an alternative or in addition thereto, provision may be made for at least one of the optical sensor devices to be displaceable along the transverse axis of the vehicle, preferably for both optical sensor devices to be displaceable along the transverse axis of the vehicle. The y-axis of the coordinate system, which is arranged perpendicular to the driving direction and the longitudinal axis, is referred to as transverse axis. A displacement of the optical sensor devices along the longitudinal direction or along the transverse axis of the vehicle may be advantageous if the freight containers to be received are not standardized or if the sizes thereof vary. In this way, the manoeuvring system can easily be set to different freight containers. By way of example, in the case of relatively long vehicles and relatively small containers, a displacement of the optical sensor devices may be meaningful in order to obtain the best possible viewing angle on the target object. Here, the optical sensor devices may also be displaced during the manoeuvring process in order hence to obtain the best possible capture of the target object.

The invention moreover relates to a method for manoeuvring a predetermined part of a vehicle into a target position provided by a target object, comprising the following steps:

capturing the target object using a first optical sensor device arranged at the vehicle, capturing the target object using a second optical sensor device arranged at the vehicle, said second optical sensor device being arranged on the vehicle in a manner offset relative to the first optical sensor device in the longitudinal direction of the vehicle, and calculating a trajectory of the predetermined part of the vehicle into the target position with the aid of an image of the target object captured by the first optical sensor device and with the aid of an image of the target object captured by the second optical sensor device.

Preferably, provision is made for the first optical sensor device to be a 2D LIDAR sensor and for the second optical sensor device to be a 3D LIDAR sensor, which is arranged at the vehicle in a position that is lower down and further towards the rear than the first optical sensor device.

Further, in accordance with a preferred development of the invention, two second optical sensor devices are provided in the form of a respective 3D LIDAR sensor, said 3D LIDAR sensors being arranged in the region of the rear right edge and rear left edge of the vehicle, respectively. Preferably, a stereo camera is arranged between the 3D LIDAR sensors in this case.

Finally, it is true that at least one of the two optical sensor devices captures whether the target object is inclined laterally and/or along the longitudinal axis thereof. In particular, there can be a readjustment during the manoeuvring to this end.

Reference is made to the fact that the above-described preferred developments of the vehicle may be applied analogously to the method according to the invention, and also that the above-described preferred developments of the method may be applied analogously to the vehicle according to the invention.

Below, the invention will be explained in more detail on the basis of a preferred exemplary embodiment, with reference being made to the drawings.

DETAILED DESCRIPTION OF THE DRAWINGS

Figure 1:
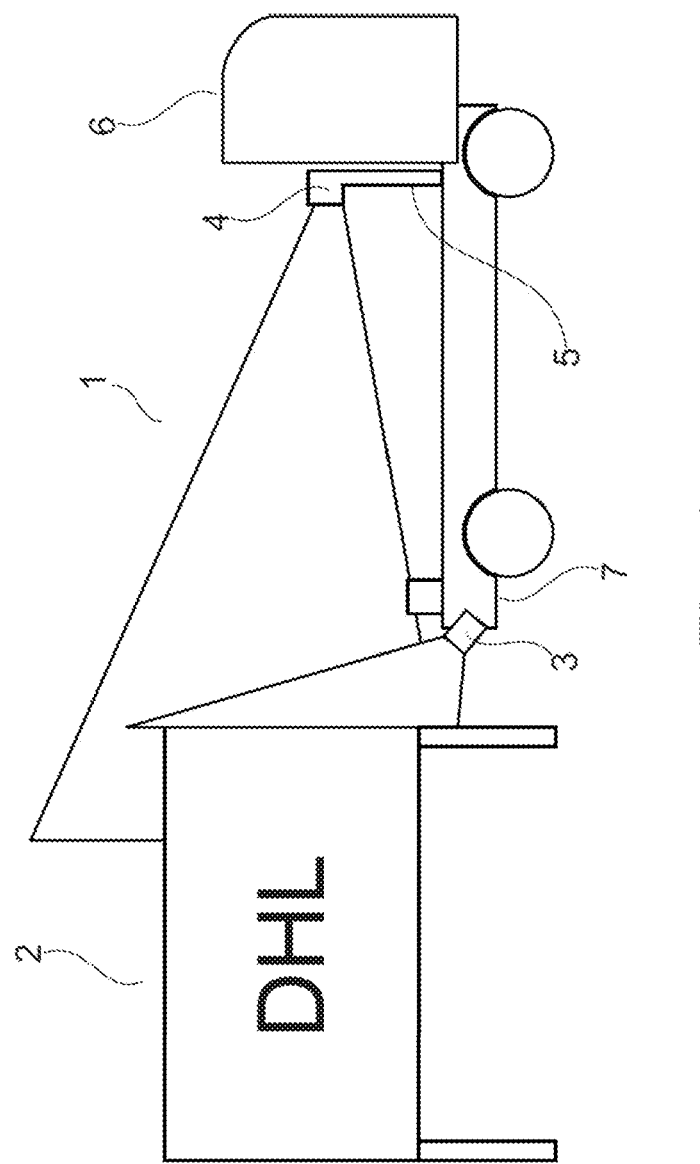
FIG. 1 shows a schematic side view of a vehicle comprising a manoeuvring system in accordance with a first preferred exemplary embodiment of the invention, FIG. 2 schematically shows a plan view of a lifting platform of a vehicle in accordance with a second preferred exemplary embodiment of the invention, FIG. 3 schematically shows a side view of a vehicle in accordance with the second preferred exemplary embodiment of the invention, FIG. 4 schematically shows manoeuvring in accordance with a preferred exemplary embodiment of the invention, FIG. 5 schematically shows a front view of a swap body

FIG. 1 shows a side view of a vehicle comprising a manoeuvring system in accordance with a first preferred exemplary embodiment of the invention, wherein the vehicle 1 points into a target position, provided by a target object 2, in the direction of the target object 2 with a predetermined part 7 of the vehicle 1 intended for manoeuvring. Here, the target object 2 is shown as a swap body.

A first sensor device 3 for capturing the target object 2 is fastened to the predetermined part 7 of the vehicle 1. The first sensor device 3 is mounted in a rotatable and swivellable manner. This renders it possible to ensure that the viewing angle thereof can be adapted to the situation and that the best possible capture of the target object 2 is ensured at all times. If the first sensor device 3 is covered by the target object during the manoeuvring for receiving the target object 2, for example when driving under the swap body, the viewing angle of the first sensor device 3 may be modified in such a way that it is able to monitor the region below the target object 2. As a result, it is possible to recognize humans and objects, and accidents and collisions can be avoided.

Further, provision is made for the height of the first sensor device 3 to be adjustable. In order to be able to capture the target object 2 in an ideal manner, a second sensor device 4 is arranged relative to the first sensor device 3 on the vehicle 1 in a manner offset in the longitudinal direction of the vehicle 1. The second sensor device 4 is fastened to such a point on the vehicle 1 from which it is able to capture the image of the target object 2, which is relevant for manoeuvring, from a position that is elevated in relation to the position of the first sensor device 3. This ensures that it is possible to monitor the entire manoeuvring process. Incidentally, this may attain a certain amount of shadowing of the first sensor device 3 by the target object 2 when the sun is low such that manoeuvring is made possible even in those situations in which the second sensor device 4 is dazzled by the sun and unable to record a usable image.

The second sensor device 4 is fastened in a height-adjustable manner in the region of the driver's cab 6 of the vehicle 1 by means of a height-adjustable fastening device 5. What may also be achieved by the height adjustment of both sensor devices 3, 4, for example in the case of autonomously driving unit load automatic guided vehicles, is that the vehicle is manoeuvred into a target position provided by a target object 2 with both ends of the longitudinal direction thereof.

Figure 2:
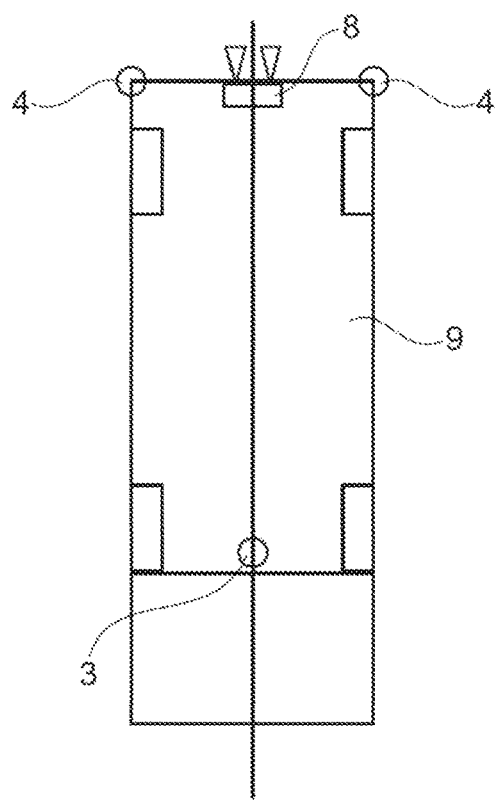

From FIG. 2, which schematically shows a plan view of a lifting platform 9 of a vehicle 1 in accordance with a second preferred exemplary embodiment of the invention, it is clear that a first optical sensor 3 in the form of a 2D LIDAR sensor is arranged on the lifting platform 9 in the vicinity of the operator's cab 14 of the vehicle 1. The arrangement of the 2D LIDAR sensor on the lifting platform is movable. A second optical sensor 4 in the form of a respective 3D LIDAR sensor is arranged in each case at the rear corners of the lifting platform 9. Hence, the 3D LIDAR sensors each have a field of view of 270°. A stereo camera 8 is situated therebetween. The arrangement of the 2D LIDAR sensor and of the 3D LIDAR sensors becomes even clearer from FIG. 3, which schematically shows a side view of the vehicle 1. The 3D LIDAR sensors are placed on the vehicle 1 lower and further to the rear than the 2D LIDAR sensor.

Figure 3:
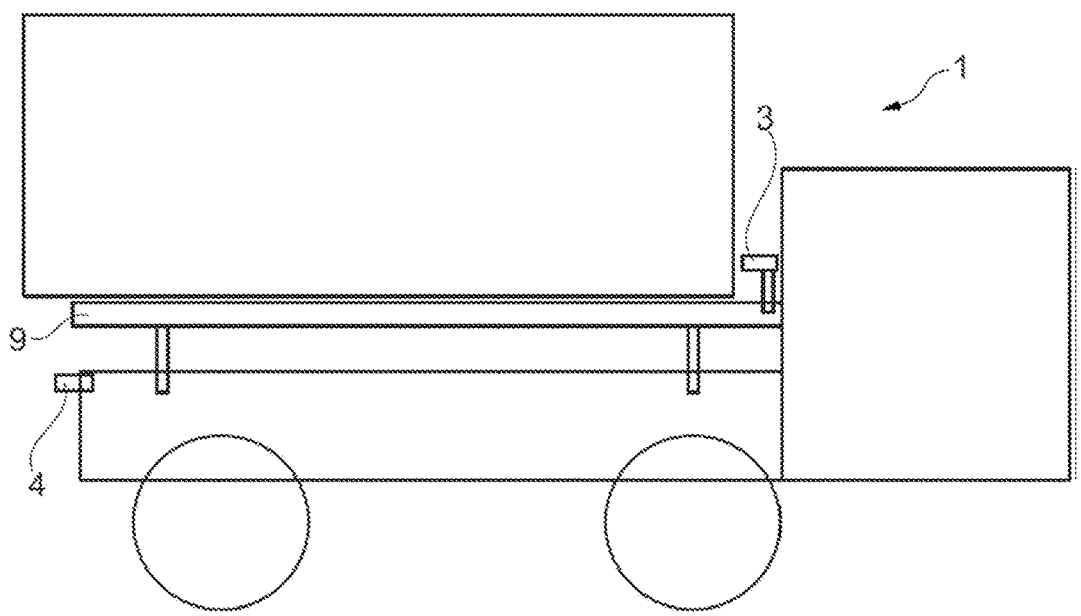
Figure 4:
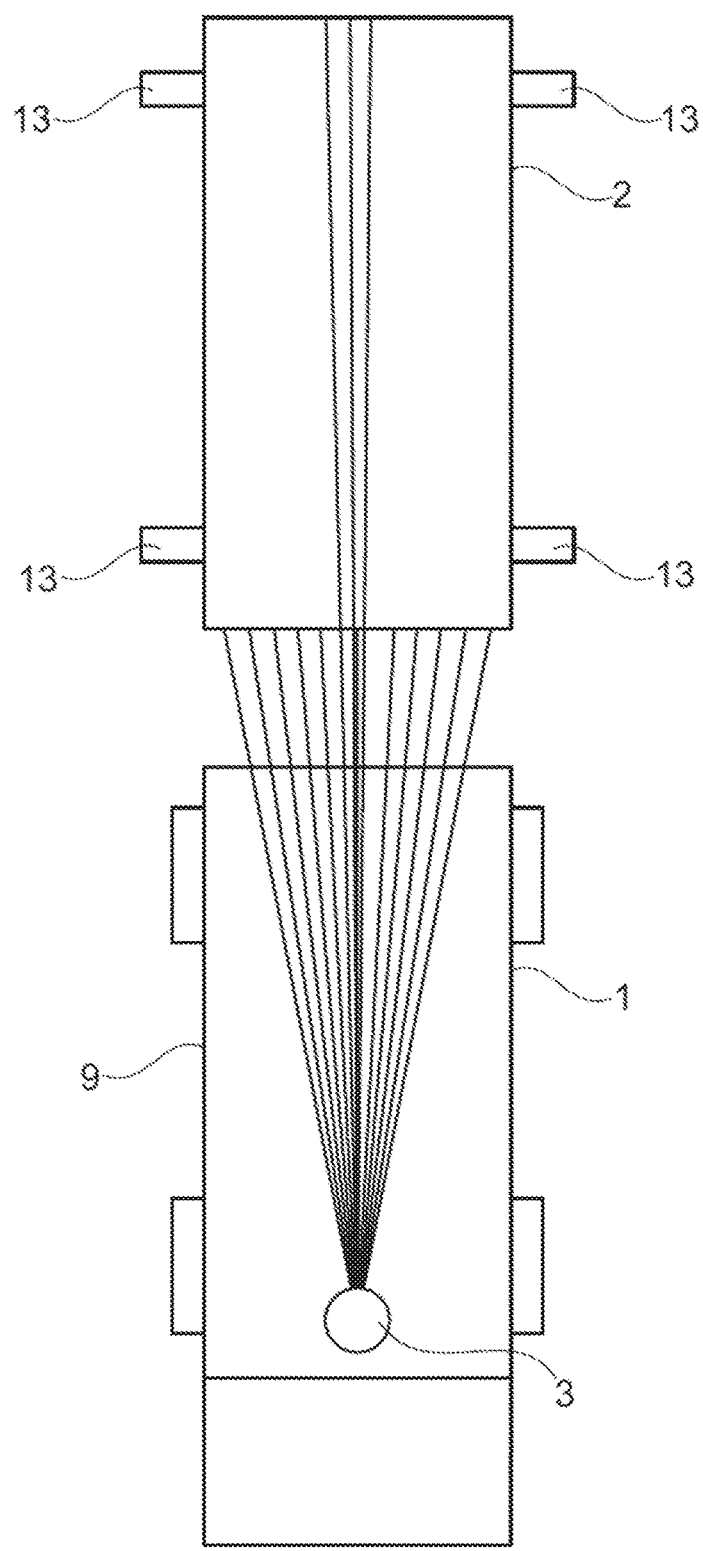
Figure 5:
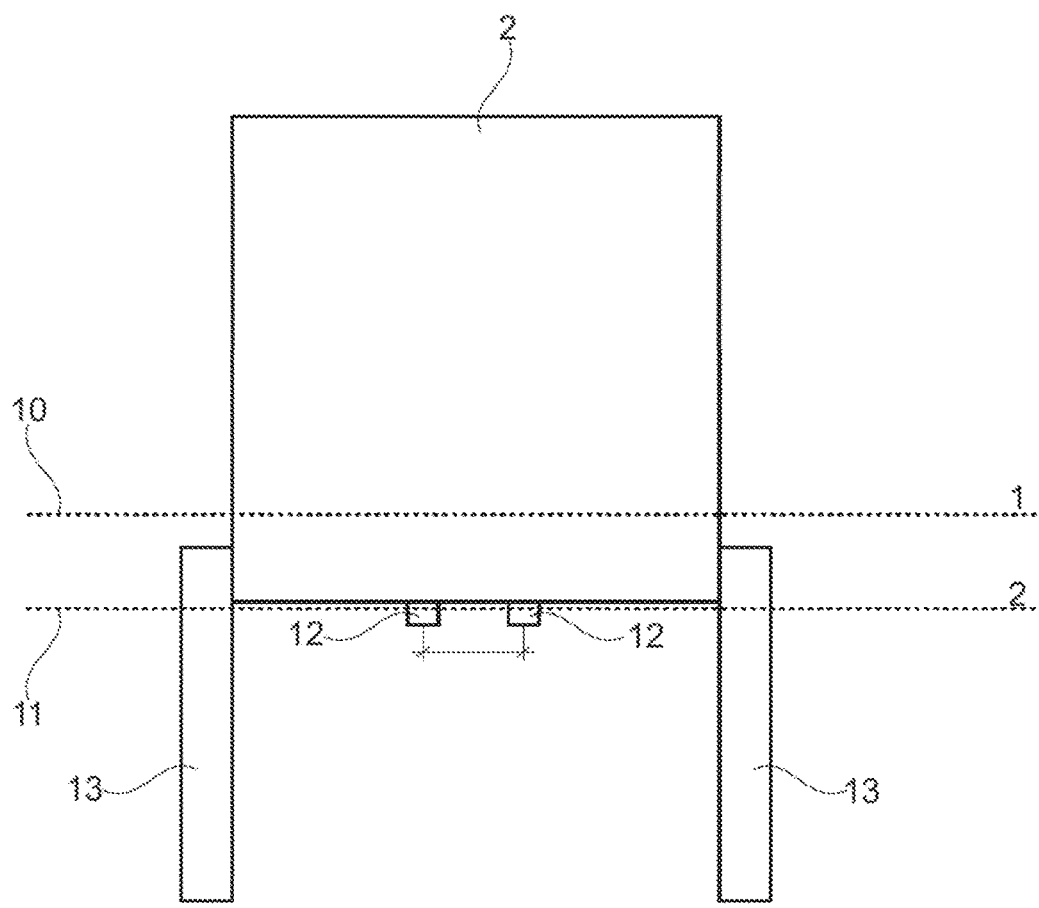
Figure 6:
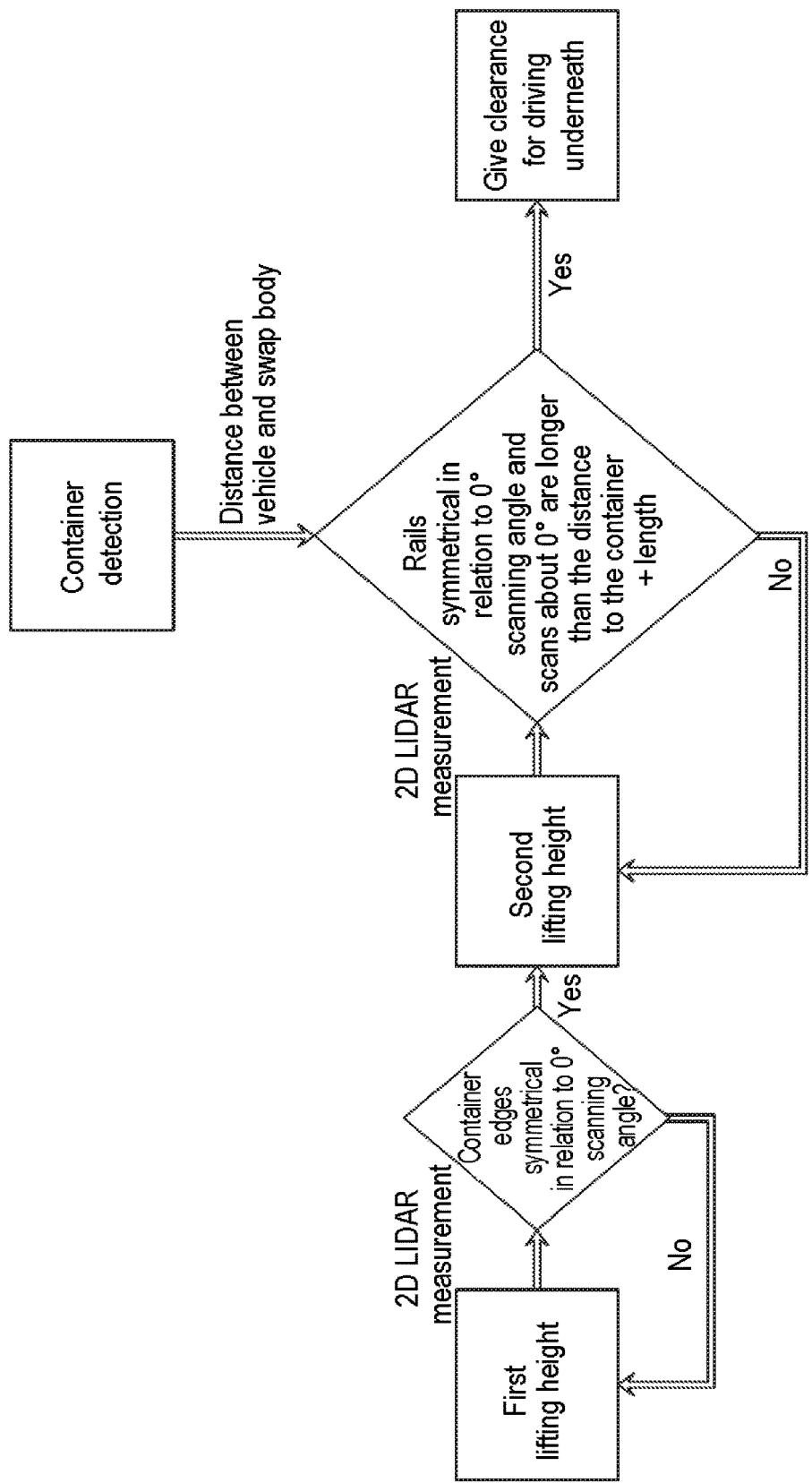
FIG. 6 shows a flowchart for a method in accordance with a preferred exemplary embodiment of the invention.

A manoeuvring method in accordance with a preferred exemplary embodiment of the invention is explained below with reference to FIGS. 4, 5 and 6, with use being made of the vehicle 1 shown in FIGS. 2 and 3. Initially, the 2D LIDAR sensor measures the edges of the target object 2 formed by a swap body on legs 13. The lifting platform 9 is subsequently moved downwards to be level with the rails 12 of the swap body. In the case of correct positioning, a fixed scanning profile emerges from the 2D LIDAR sensor. Here, the 2D LIDAR sensor uses the rail guide as a collimator. Hence, it is possible to very precisely determine the position of the vehicle 1 relative to the swap body.

After approximately positioning by way of the stereo camera 8 and the 3D LIDAR sensors, the lifting platform 9 is lifted until the frontage of the swap body is recognized (first lifting height 10). Now, on the basis of the 2D scan, it is first of all possible to check whether the positioning is sufficiently accurate. This is carried out by way of the outer edges of the swap body. Subsequently, the lifting platform 9 is lowered until a bearing with the 2D LIDAR sensor is made possible by the rails 12 of the swap body (second lifting height 11). In the case of the correct positioning of lifting platform 9 and vehicle 1, the following must apply: the length ascertained by means of the LIDAR measurement is greater than or equal to the length of the swap body plus the distance of the 2D LIDAR sensor from the frontage of the swap body. The distance from the frontage of the swap body emerges by a 3D measurement for approximate positioning.

LIST OF REFERENCE NUMBERS

Vehicle 1
Target object 2
First sensor device 3
Second sensor device 4
Fastening device 5
Driver's cab 6
Predetermined part of the vehicle 7
Stereo camera 8
Lifting platform 9
First lifting height 10
Second lifting height 11
Rails 12
Legs 13
Operator's cab 14

The invention claimed is:

1. Vehicle comprising a manoeuvring system for manoeuvring a predetermined part of the vehicle into a target position provided by a target object, wherein the manoeuvring system comprises a first optical sensor, arranged at the vehicle, for capturing the target object and a calculating device for calculating a trajectory of the predetermined part of the vehicle into the target position with the aid of an image of the target object captured by the first optical sensor, wherein the manoeuvring system comprises a second optical sensor arranged at the vehicle in a manner offset relative to the first optical sensor in the longitudinal direction of the vehicle, wherein the optical sensors are configured in such a way that they permit the calculation of a trajectory of the predetermined part of the vehicle into the target position independently of one another, together with the calculating device.

2. Vehicle comprising a manoeuvring system according to claim 1, wherein the optical sensors are selected from the group consisting of: cameras, LIDAR sensors, and time-of-flight cameras.

3. Vehicle comprising a manoeuvring system according to claim 1, wherein the optical sensors are fastened to the vehicle in a manner offset along the vertical axis of the vehicle.

4. Vehicle comprising a manoeuvring system according to claim 1, wherein the height of at least one of the optical sensors is adjustable.

5. Vehicle comprising a manoeuvring system according to claim 4, wherein the heights of both optical sensors are adjustable.

6. Vehicle comprising a manoeuvring system according to claim 1, wherein the first optical sensor is fastened to the predetermined part of the vehicle and the second optical sensor is fastened to such a location on the vehicle from which the second optical sensor is able to capture the image of the target object, relevant for manoeuvring, from a position which is elevated in relation to the position of the first optical sensor.

7. Vehicle comprising a manoeuvring system according to claim 1, wherein the viewing angle of the first optical sensor differs from the viewing angle of one of the second optical sensors.

8. Vehicle comprising a manoeuvring system according to claim 1, wherein at least one optical sensor is rotatable and/or swivellable and hence that the viewing angles of at least one of the optical sensors are adjustable.

9. Vehicle comprising a manoeuvring system according to claim 8, wherein both optical sensors are rotatable and/or swivellable and that the viewing angle of both optical sensors is adjustable.

10. Vehicle comprising a manoeuvring system according to claim 1, wherein at least one of the optical sensors is displaceable along the longitudinal direction of the vehicle.

11. Vehicle comprising a manoeuvring system according to claim 10, wherein both optical sensors are displaceable along the longitudinal direction of the vehicle.

12. Vehicle comprising a manoeuvring system according to claim 1, wherein at least one of the optical sensors is displaceable along the transverse axis of the vehicle.

13. Vehicle comprising a manoeuvring system according to claim 12, wherein both optical sensors are displaceable along the transverse axis of the vehicle.

14. Method for manoeuvring a predetermined part of a vehicle into a target position provided by a target object, comprising the following steps:
    capturing the target object using a first optical sensor arranged at the vehicle,
    capturing the target object using a second optical sensor arranged at the vehicle, said second optical sensor being arranged on the vehicle in a manner offset relative to the first optical sensor in the longitudinal direction of the vehicle,
    calculating a trajectory of the predetermined part of the vehicle into the target position with the aid of an image of the target object captured by the first optical sensor and with the aid of an image of the target object captured by the second optical sensor independently of one another.

15. Method according to claim 14, wherein the first optical sensor is a 2D LIDAR sensor and the second optical sensor is a 3D LIDAR sensor, which is arranged at the vehicle in a position that is lower down and further towards the rear than the first optical sensor.

16. Method according to claim 15, wherein two second optical sensors are provided in the form of a respective 3D LIDAR sensor, said 3D LIDAR sensors being arranged in the region of the rear right edge and rear left edge of the vehicle, respectively.

17. Method according to claim 16, wherein a stereo camera is arranged between the 3D LIDAR sensors.

18. Method according to claim 14, wherein at least one of the two optical sensors captures whether the target object is inclined laterally and/or along the longitudinal axis thereof.

19. Vehicle comprising a manoeuvring system for manoeuvring a predetermined part of the vehicle into a target position provided by a target object, wherein the manoeuvring system comprises a first optical sensor, arranged at the vehicle, for capturing the target object and a calculating device for calculating a trajectory of the predetermined part of the vehicle into the target position with the aid of an image of the target object captured by the first optical sensor, wherein the manoeuvring system comprises a second optical sensor arranged at the vehicle in a manner offset relative to the first optical sensor in the longitudinal direction of the vehicle, wherein both optical sensors are rotatable and/or swivellable and that the viewing angle of both optical sensors is adjustable.

* * * * *

UNITED STATES PATENT AND TRADEMARK OFFICE
CERTIFICATE OF CORRECTION

PATENT NO. : 10,315,697 B2
APPLICATION NO. : 15/631013
DATED : June 11, 2019
INVENTOR(S) : Martin Sommer et al.

It is certified that error appears in the above-identified patent and that said Letters Patent is hereby corrected as shown below:

On the Title Page

Please replace Applicant "Deutsche Post AG AG, Boon (DE)" with --Deutsche Post AG, Bonn (DE)--

Please replace inventor Fabian Schmitt's Country "(DE)" with --(BE)--

Signed and Sealed this
Thirtieth Day of July, 2019

Andrei Iancu
*Director of the United States Patent and Trademark Office*